US008792521B2

(12) United States Patent
Gomez et al.

(10) Patent No.: US 8,792,521 B2
(45) Date of Patent: Jul. 29, 2014

(54) MULTI-STANDARD FRONT END USING WIDEBAND DATA CONVERTERS

(75) Inventors: Ray (Ramon) Gomez, San Juan Cap, CA (US); Len Dauphinee, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 274 days.

(21) Appl. No.: 13/243,117

(22) Filed: Sep. 23, 2011

(65) Prior Publication Data

US 2013/0077544 A1    Mar. 28, 2013

(51) Int. Cl.
*H04B 1/38* (2006.01)
*H04L 27/06* (2006.01)
*H04W 4/00* (2009.01)
*H04J 3/04* (2006.01)

(52) U.S. Cl.
USPC ............. 370/537; 370/542; 375/219; 455/73; 341/110

(58) Field of Classification Search
USPC ................... 370/297, 537, 535, 542; 455/73; 375/219, 220; 341/110; 710/69; 725/71; 330/306
See application file for complete search history.

(56) References Cited

U.S. PATENT DOCUMENTS

| 6,400,815 | B1 * | 6/2002 | Gilboy et al. ................. 379/171 |
| 8,199,684 | B2 * | 6/2012 | Eng ................ 370/297 |
| 8,418,212 | B2 * | 4/2013 | Powell ............. 725/82 |
| 8,457,574 | B2 * | 6/2013 | Gomez ...................... 455/150.1 |
| 8,503,515 | B2 * | 8/2013 | Anvari ........................... 375/219 |
| 2002/0010940 | A1 | 1/2002 | Hornsby et al. |
| 2002/0073434 | A1 | 6/2002 | Pience |
| 2003/0189666 | A1 * | 10/2003 | Dabell et al. ................ 348/389.1 |
| 2003/0203743 | A1 * | 10/2003 | Sugar et al. ................. 455/550.1 |
| 2005/0094714 | A1 * | 5/2005 | Robinson ....................... 375/148 |
| 2005/0157818 | A1 | 7/2005 | Dauphinee |
| 2005/0195335 | A1 | 9/2005 | Gomez et al. |
| 2007/0054629 | A1 * | 3/2007 | Maligeorgos et al. .......... 455/88 |
| 2012/0287866 | A1 * | 11/2012 | Petrovic et al. ............... 370/329 |

FOREIGN PATENT DOCUMENTS

CN          101303403 A       11/2008

OTHER PUBLICATIONS

European Search Report for European Application No. 12 00 5501, mailed Jan. 25, 2013 from The Hague; 3 pages.

(Continued)

*Primary Examiner* — Ahmed Elallam
(74) *Attorney, Agent, or Firm* — Sterne, Kessler, Goldstein & Fox P.L.L.C.

(57) ABSTRACT

Embodiments provide an area, cost, and power efficient multi-service transceiver architecture. The multi-service transceiver architecture simplifies receiver/transmitter front ends needed for a multi-service architecture, by replacing significant portions of multiple receiver and/or transmitter front ends with a single ADC and/or DAC, respectively. In embodiments, a plurality of received service contents are combined into one composite analog/RF signal and applied to an ADC. The ADC converts the composite signal into a composite multi-service digital signal. Digital techniques are then used to separate the plurality of service contents into a plurality of respective digital streams that each can be independently demodulated. Similarly, in the transmit direction, a plurality of digital streams, including a plurality of service contents, are combined into one composite digital signal. The composite digital signal is applied to a DAC to generate a composite multi-service analog/RF signal for subsequent transmission over a coaxial cable or wirelessly via an antenna.

22 Claims, 7 Drawing Sheets

(56) References Cited

OTHER PUBLICATIONS

Chinese Office Action directed toward related CN Patent Application No. 201210357136.9, dated Jun. 5, 2014 from the Chinese Patent Office; 7 pages.

English language abstract of CN 101303403 A, Thomson Innovation, http://www.thomsoninnovation.com, accessed Jun. 17, 2014, listed as document FP1 on accompanying form PTO/SB/08A; 6 pages.

* cited by examiner

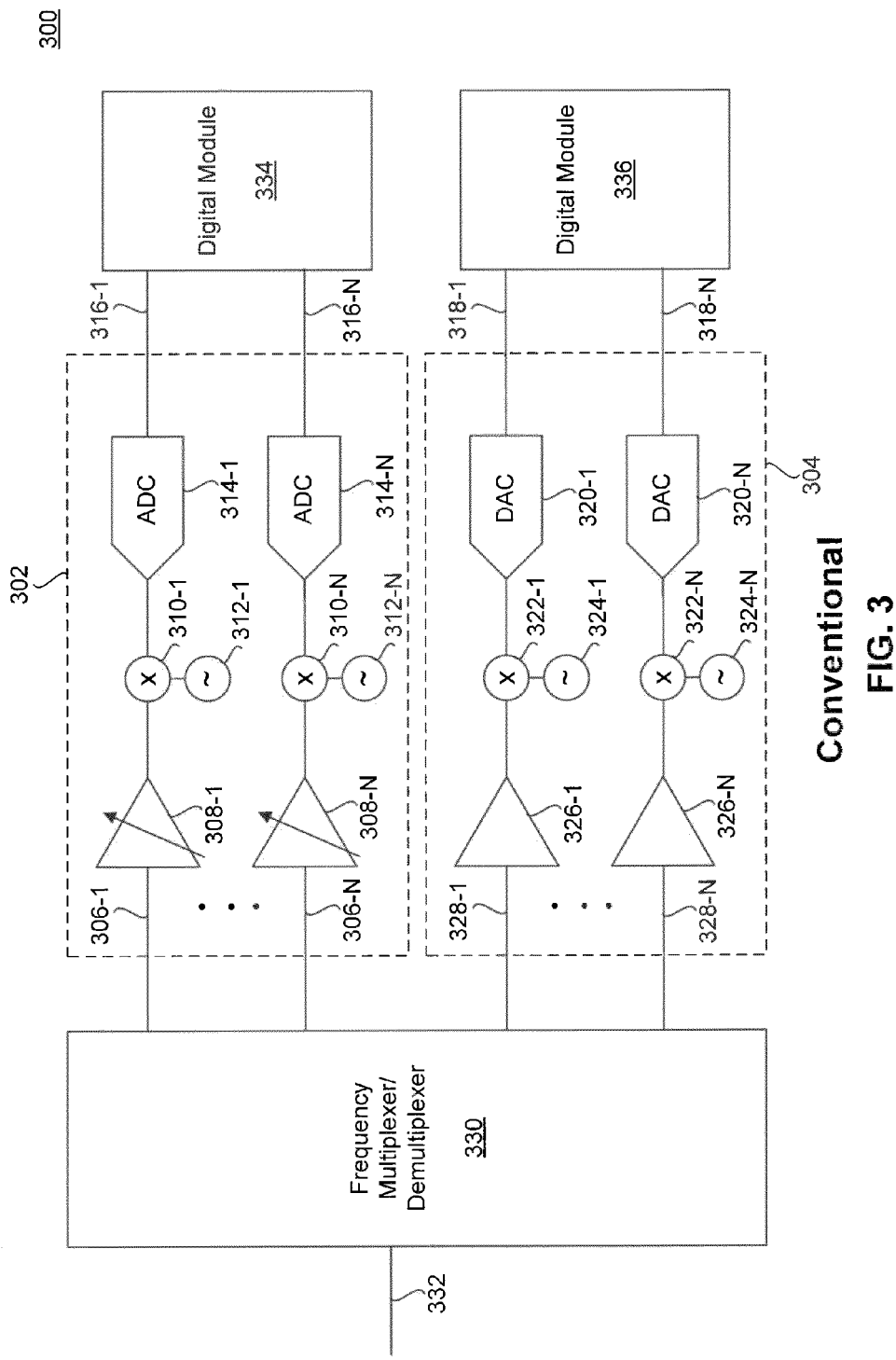
Conventional
FIG. 3

MULTI-STANDARD FRONT END USING WIDEBAND DATA CONVERTERS

BACKGROUND

1. Field of the Invention

The present invention relates generally to communication systems.

2. Background Art

Many modern consumer communications products incorporate multiple individual communication services. Such products include, for example, cellular phone handsets, set top boxes (STBs), and automotive infotainment systems. Example services supported by theses consumer products include cable television (CATV) service (e.g., using the Data Over Cable Service Interface Specification (DOCSIS) standards or the Digital Video Broadcasting-Cable (DVB-C/C2) standards), direct broadcast satellite (DBS) service (e.g., using the Digital Video Broadcasting-Satellite (DVB-S/S2) standards), home networking (e.g., using the Multimedia over Coax Alliance (MOCA®) 1.0, 1.1, or 2.0 standards), etc.

With multiple services incorporated in a single product, the multiple services may have to be transmitted or received over the same communications medium (e.g., same coaxial cable, wireless antennas, etc.).

Conventional multi-service transceivers use dedicated transmitter/receiver front ends per service type and/or supported service channel, with each front end including separate homodyne/heterodyne transmitter/receiver structures. As a result, conventional multi-service transceivers are area, cost, and power inefficient. In addition, conventional multi-service transceivers are difficult to customize for different product variants supporting different services and/or frequency spectrum allocations.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 3 illustrates a conventional multi-service transceiver.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Many modern consumer communications products incorporate multiple individual communication services. Such products include, for example, cellular phone handsets, set top boxes (STBs), and automotive infotainment systems.

Example services supported by theses consumer products include cable television (CATV) service (e.g., using the Data Over Cable Service Interface Specification (DOCSIS) standards or the Digital Video Broadcasting-Cable (DVB-C/C2) standards), direct broadcast satellite (DBS) service (e.g., using the Digital Video Broadcasting-Satellite (DVB-S/S2) standards), home networking (e.g., using the Multimedia over Coax Alliance (MOCA®) 1.0, 1.1, or 2.0 standards), broadcast television (e.g., using analog, Advanced Television Systems Committee (ATSC), Digital Video Broadcast-Terrestrial (DBV-T/T2) standards), broadcast Frequency Modulation (FM) radio, navigation services (e.g., Global Positioning System (GPS) and Galileo), WiFi® (e.g., 802.11a, b, g, and n), Bluetooth®, cellular phone service, cordless phone service, and other new communication services using television "white spaces" spectrum.

Figure 1:
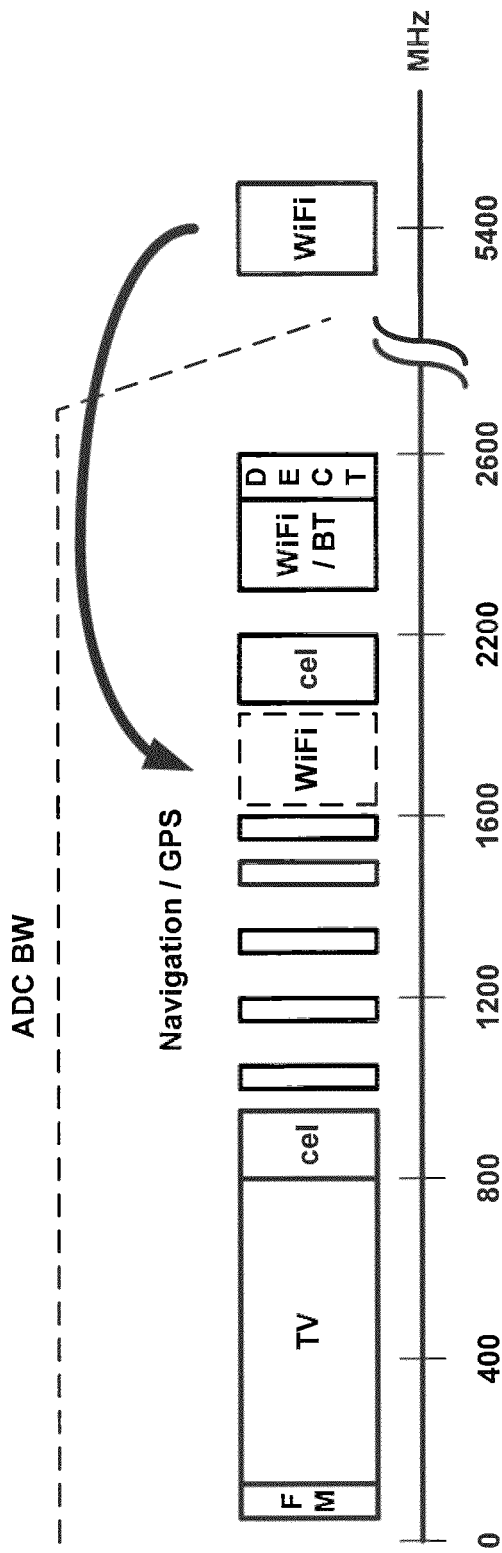
FIG. 1 illustrates an example allocation of multiple services over a frequency spectrum.

Typically, each of these services operates in one or more designated frequency bands, and in aggregate these services today use a frequency range from very low MHz frequencies to over 5 GHz. FIG. 1 illustrates an example allocation 100 of services over a frequency spectrum that ranges from low FM frequencies to a few GHz. Different combinations of services can be allocated within the frequency spectrum, including high frequency services that are down-converted to within the frequency spectrum. For example, as shown in FIG. 1, a WiFi service in the 5 GHz band can be down-converted and combined with lower frequency services.

Figure 2:
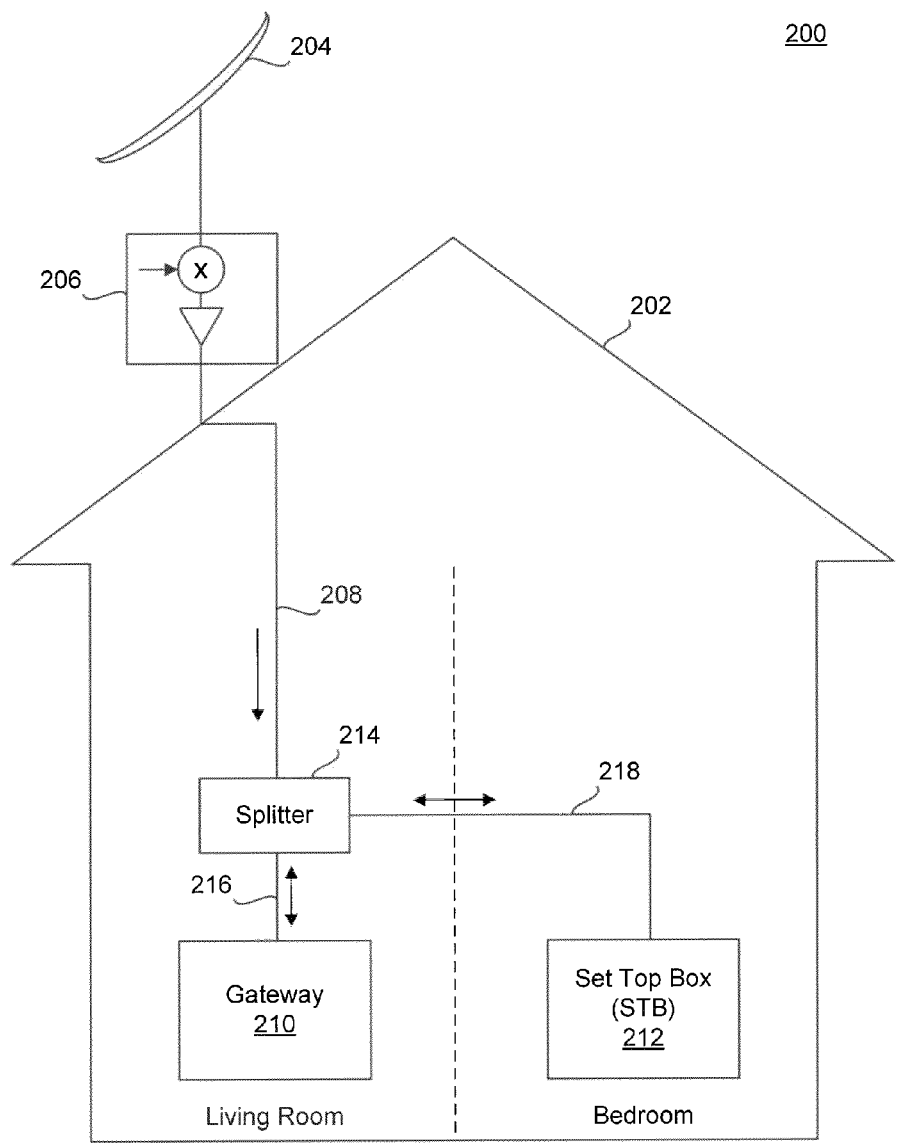
FIG. 2 illustrates an example scenario in which multiple services may be transmitted or received over the same communications medium.

With multiple services incorporated in a single product, the multiple services may have to be transmitted or received over the same communications medium (e.g., same coaxial cable, wireless antennas, etc.). FIG. 2 illustrates an example scenario 200 in which multiple services may be transmitted or received over the same communications medium by a single product. Example scenario 200 is provided for the purpose of illustration only.

As shown in FIG. 2, example scenario 200 includes a gateway 210, located in the living room, for example, of a house 202, a set-top box (STB) 212, located in a bedroom of house 202, and a parabolic dish antenna 204 and associated out-door unit (ODU) 206, located on the rooftop of house 202.

Parabolic dish antenna 204 receives a DBS signal. The DBS signal is down-converted by ODU 206 (for example from 18 GHz down to the 950-2150 MHz range) to generate an intermediate frequency (IF) carrying DBS satellite service content. The IF signal is transmitted by ODU 206 to gateway 210 over a coaxial cable 208.

As shown in FIG. 2, coaxial cable 208 may be fed into a splitter 214, and the IF signal then transported over a coaxial cable 216 connected to an input port of gateway 210. Gateway 210 may be connected to a display system (not shown in FIG. 2) for displaying the satellite content carried by the IF signal. In addition to receiving satellite content, gateway 210 serves as a media gateway for distributing the satellite content around house 202. For example, gateway 210 may distribute the satellite content to STB 212, located in the bedroom of house 202. Satellite content distributed to STB 212 is sent over coaxial cable 216, through splitter 214, and onto coaxial cable 218 to STB 212.

In addition to being a satellite media gateway, gateway 210 includes a MoCA home networking transceiver (not shown in FIG. 2), which allows it to form a home network with STB 212. Using the MoCA transceiver, gateway 210 transmits/receives MoCA content over coaxial cable 216, through splitter 214, and over coaxial cable 218 to/from STB 212.

Accordingly, gateway 210 transmits/receives both DBS satellite content and MoCA content over coaxial cable 216. Transmitted/received DBS satellite content and MoCA content thus may coexist (i.e., occur simultaneously) over coaxial cable 216. An example frequency plan used by gateway 210 may use the standard worldwide DBS satellite IF range of 950-2150 MHz to transmit/receive DBS satellite content and a lower frequency range (e.g., centered at 500 MHz) for MoCA content.

To support both services (i.e., DBS and MoCA), gateway 210 uses a multi-service transceiver. Conventional multi-service transceivers use multiple transmitter/receiver front ends, including one or more transmitter/receiver front ends per service and/or supported service channel. For example, gateway 210 may use multiple transmitter/receiver front ends for DBS satellite (one for each satellite channel, in order to receive all channels simultaneously) and one transmitter/receiver front end for MoCA. Transmitter/receiver front ends are typically implemented using conventional heterodyne or homodyne (zero-IF) conversion modules, including analog mixers, phase locked loops (PLLs), and local oscillators (LOs).

FIG. 3 illustrates a conventional multi-service transceiver 300. As shown in FIG. 3, transceiver 300 includes a plurality of receiver front ends 302, a plurality of transmitter front ends 304, a frequency multiplexer/demultiplexer module 330, and digital modules 334 and 336. Transceiver 300 may be used in gateway 210 to support both DBS and MoCA service, for example. Transceiver 300 is connected to a communications medium 332 to transmit/receive service content. Communications medium 322 may be a coaxial cable, such as coaxial cable 216 in FIG. 2. Alternatively, communications medium 322 may be a signal path that couples transceiver 300 to one or more wireless transmit/receive antennas.

Receiver front ends 302 each includes a low-noise amplifier (LNA) 308, a down-converter including at least one mixer 310 and LO 312, and an analog-to-digital converter (ADC) 314. Each receiver front end 302 is dedicated to a respective service type and/or service channel. For example, some of front ends 302 may be dedicated to DBS service, and additionally to receiving DBS service content over respective DBS channels.

In receive operation, transceiver 300 receives an analog signal over communications medium 332. The analog signal may be a composite signal that contains service contents from multiple services. For example, the analog signal may include DBS service content and MoCA service content. Typically, the service contents have complete separation among them so that they can be separated according to frequency.

The analog signal is input into frequency multiplexer/demultiplexer module 330. Module 330 separates the service contents contained in the analog signal based on frequency to generate a plurality of analog signals 306-1 to 306-N, and then routes each of analog signals 306-1 to 306-N to a respective dedicated receiver front end 302. Module 330 may be a diplexer, triplexer, or similar device. Each analog signal 306 is then processed by its respective front end 302 to generate a respective digital signal 316, representative of the service content. Digital signals 316-1 to 316-N are provided to digital module 334 for further processing (e.g., demodulation, demapping, etc.). Alternatively, digital signals 316-1 to 316-N are each provided to a respective digital module based on its service type (e.g., digital signals containing DBS service content are provided to a DBS digital module, digital signal containing MoCA service content are provided to a MoCA digital module, etc.).

Transmitter front ends 304 each includes a digital-to-analog converter (DAC) 320, an up-converter including at least one mixer 322 and a LO 324, and a power amplifier (PA) 326. Each transmitter front end 304 is dedicated to a respective service type and/or service channel. For example, some of front ends 302 may be dedicated to DBS service, and additionally to transmitting DBS content over respective DBS channels.

In transmit operation, one or more digital modules, such as digital module 336, provide digital signals 318-1 to 318-N to respective transmit front ends 304. Digital signals 318-1 to 318-N each includes a respective service content. Service contents contained in digital signals 318-1 to 318-N may be of same or different service type. Each digital signal 318 is processed by its respective transmit front end 304 to generate a respective analog signal 328. In particular, each digital signal 318 is converted from digital to analog by a respective DAC 320, frequency up-converted by a respective up-converter 322 to a respective frequency band, and amplified, as needed, by a respective PA 326.

Analog signals 328-1 to 328-N are input into frequency multiplexer/demultiplexer module 330. Module 330 combines analog signals 328-1 to 328-N to generate a composite analog signal containing service contents from multiple services. For example, the composite analog signal may include DBS service content and MoCA service content. The composite analog signal is then transmitted over communications medium 332.

As described above, transceiver design 300 uses dedicated transmitter/receiver front ends per service type and/or supported service channel, with each front end including separate homodyne/heterodyne transmitter/receiver structures. As a result, transceiver 300 requires a large amount of integrated circuit die to implement. In particular, transceiver 300 requires the use of multiple analog mixers and multiple frequency agile phase locked loops (PLLs), for example, to provide distinct LO signals to the analog mixers. As such, transceiver 300 is both cost and power inefficient. Another disadvantage of transceiver design 300 is in the difficulty to customize it for different product variants supporting different services and/or frequency spectrum allocations. As such, with new services and frequency allocations arising constantly in the rapidly-changing consumer communications marketplace, extensive design efforts will be needed to provide cost-effective integrated circuits for these products.

Embodiments of the present invention, as further described below, provide an area, cost, and power efficient multi-service transceiver architecture. The multi-service transceiver architecture simplifies receiver/transmitter front ends needed for a multi-service transceiver, by replacing significant portions of multiple receiver and/or transmitter front ends with a single ADC and/or DAC, respectively.

According to embodiments, a plurality of received service contents are combined into one composite analog/RF signal and applied to an ADC. The ADC converts the composite signal into a composite multi-service digital signal. Digital techniques (e.g., digital filtering, digital mixing, etc.) are then used to separate the plurality of service contents into a plurality of respective digital streams (one for each service and/or service channel) that each can be independently demodulated. Similarly, in the transmit direction, a plurality of digital streams, including a plurality of service contents, are combined into one composite digital signal. The composite digital signal is applied to a DAC to generate a composite multi-service analog/RF signal for subsequent transmission over a coaxial cable or wirelessly via an antenna.

Figure 4:
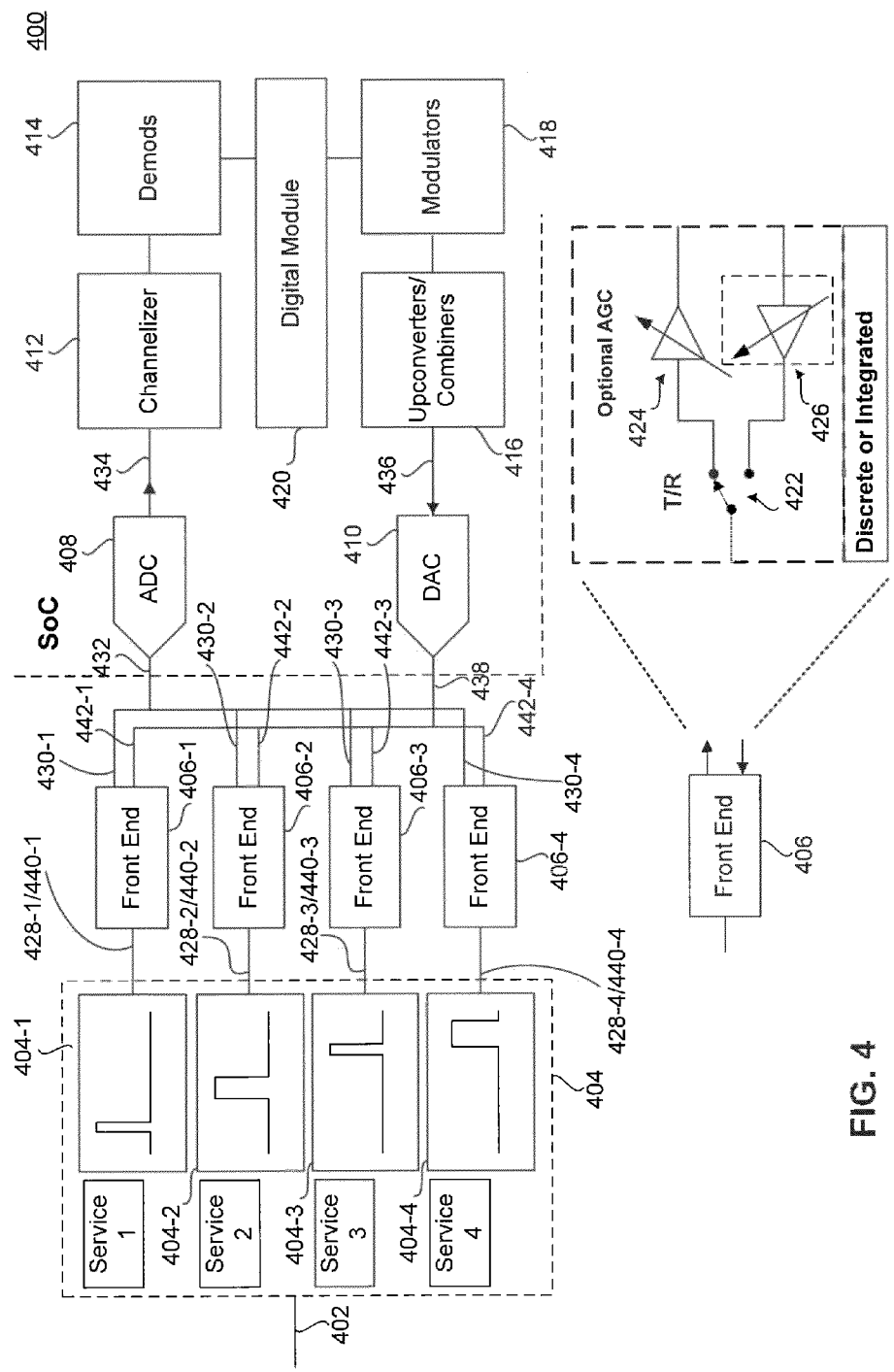
FIG. 4 illustrates an example multi-service transceiver according to an embodiment of the present invention.

FIG. 4 illustrates an example multi-service transceiver 400 according to an embodiment of the present invention. Example transceiver 400 supports four services, each service transmitted/received over a respective frequency band. As would be understood by a person of skill in the art based on the teachings herein, multi-service transceivers according to embodiments may be designed to support any number of services. The supported services can be any of the example services described above, including, without limitation, CATV service, DBS service, home networking (e.g., MOCA, broadcast television (e.g., analog, AATSC, DBV-T/T2), broadcast FM radio, navigation services (e.g., GPS and Galileo), WiFi®, Bluetooth®, cellular phone service, cordless phone service, and other new communication services using television "white spaces" spectrum.

As shown in FIG. 4, example transceiver 400 includes a frequency multiplexer/demultiplexer module 404, a plurality of front ends 406-1 to 406-4, one per supported service and/or service channel, an ADC 408, a DAC 410, a channelizer module 412, demodulators 414, modulators 418, upconverters/combiners 416, and a digital module 420. Example transceiver 400 may be used in gateway 210 to support DBS and MoCA services, for example.

Example transceiver 400 is connected to a communications medium 402 to transmit/receive service content. Communications medium 402 may be a coaxial cable, such as coaxial cable 216 in FIG. 2. Alternatively, communications medium 402 may be a signal path that couples transceiver 400 to one or more wireless transmit/receive antennas.

In receive operation, transceiver 400 receives an analog signal over communications medium 402. The analog signal may be a composite signal that contains service contents from up to four services. For example, the analog signal may include CATV service content, DBS satellite service content, MoCA service content, and down-converted WiFi service content. The various service contents preferably have complete frequency separation among them so that they can be separated according to frequency.

The composite analog signal is input into frequency multiplexer/demultiplexer module 404. Module 404 separates the service contents contained in the composite analog signal based on frequency to generate a plurality of analog signals 428-1 to 428-4 each containing a respective service content. Module 404 then routes each of analog signals 428-1 to 428-4 to a respective dedicated front end module 406. In an embodiment, module 404 includes four band-pass filters 404-1 to 404-4, each configured to pass content in a designated frequency band of a respective service. Filters 404-1 to 404-4 receive the composite analog signal and generate analog signals 428-1 to 428-4, respectively.

Front end modules 406-1 to 406-4 are each dedicated to a respective service and/or service channel. For example, some of front end modules 406 may be dedicated to DBS service, and additionally to specific DBS service channels. In an embodiment, each front end module 406 includes a transmit/receive (T/R) switch 422, a receive path including a LNA 424 with optional gain control, and a transmit path including a variable gain PA 426. In receive operation, T/R switch 422 couples the receive path of front end module 406 to module 404. As such, analog signals 428-1 to 428-4 are each amplified, as appropriate, by a respective LNA 424-1 to 424-4 to generate respective gain controlled analog signals 430-1 to 430-4. In embodiments, same or different amplification levels may be applied to analog signals 428-1 to 428-4. For example, analog signals 428-1 to 428-4 may be amplified as needed to equalize their signal levels. Equalization is typically needed when different services are received at different power levels. For example, referring to example scenario 200 described above, MoCA service may be received at higher power by gateway 210 than DBS satellite service, requiring such equalization.

Analog signals 430-1 to 430-4 generated, respectively, by front end modules 406-1 to 406-4 are combined to generate a composite multi-service analog signal 432. Analog signal 432 is applied to an ADC 408 to generate a composite multi-service digital signal 434. In embodiment, ADC 408 is a wideband ADC.

A channelizer module 412 separates the various service contents contained in digital signal 434 into a plurality of respective digital streams (one for each service and/or service channel) and provides the digital streams to one or more demodulators 414. Channelizer module 412 may use a variety of digital techniques to separate the various service contents in digital signal 434, including, for example, digital mixing and filtering techniques. Demodulators 414 demodulate each of the digital streams independently, and provide demodulated service content data to a digital module 420 for further processing.

In transmit operation, digital module 420 provides service content data from one or more services to one or more modulators 418. Modulators 418 modulate the service content to generate modulated digital streams. Upconverters/combiners 416 frequency up-convert the modulated digital streams to respective frequencies, and combine the up-converted digital streams to generate a composite multi-service digital signal 436.

Digital signal 426 is applied to a DAC 410 to generate a composite multi-service analog signal 438. In an embodiment, DAC 410 is a wideband DAC. A frequency demultiplexer or similar structure(s) (not shown in FIG. 4) separates the individual service contents contained in analog signal 438 to generate a plurality of analog signals 442-1 to 442-4, each containing a respective service content. In another embodiment, analog signal 438 is further conditioned (e.g., amplified, filtered) prior to separation. For example, if the individual service contents require significant amplification to meet transmit power levels, analog signal 438 may be amplified prior to separation, and then the individual service contents adjusted as needed in front end modules 406.

Analog signals 442-1 to 442-4 are each applied to a respective front end module 406-1 to 406-4. In transmit operation, T/R switch 422 couples the transmit path of front end module 406 to module 404. As such, analog signals 442-1 to 442-4 are each amplified, as appropriate, by a respective PA 426-1 to 426-4 to generate respective amplified analog signals 440-1 to 440-4. In embodiments, same or different amplification levels may be applied to analog signals 442-1 to 442-4. For example, analog signals 442-1 to 442-4 are each amplified according to a required transmit power of the respective service content carried by the signal. According to embodiments, PAs 426-1 to 426-4 are optional. For example, in an embodiment, DAC 410 is a power DAC capable of providing sufficient amplification that PA 426 in the transmit path of front end module 406 can be eliminated.

Analog signals 440-1 to 440-4 are input into frequency multiplexer/demultiplexer module 404. Module 404 combines analog signals 440-1 to 440-4 to generate a composite analog signal containing service contents from multiple services. The composite analog signal is then transmitted over communications medium 402.

Figure 5:
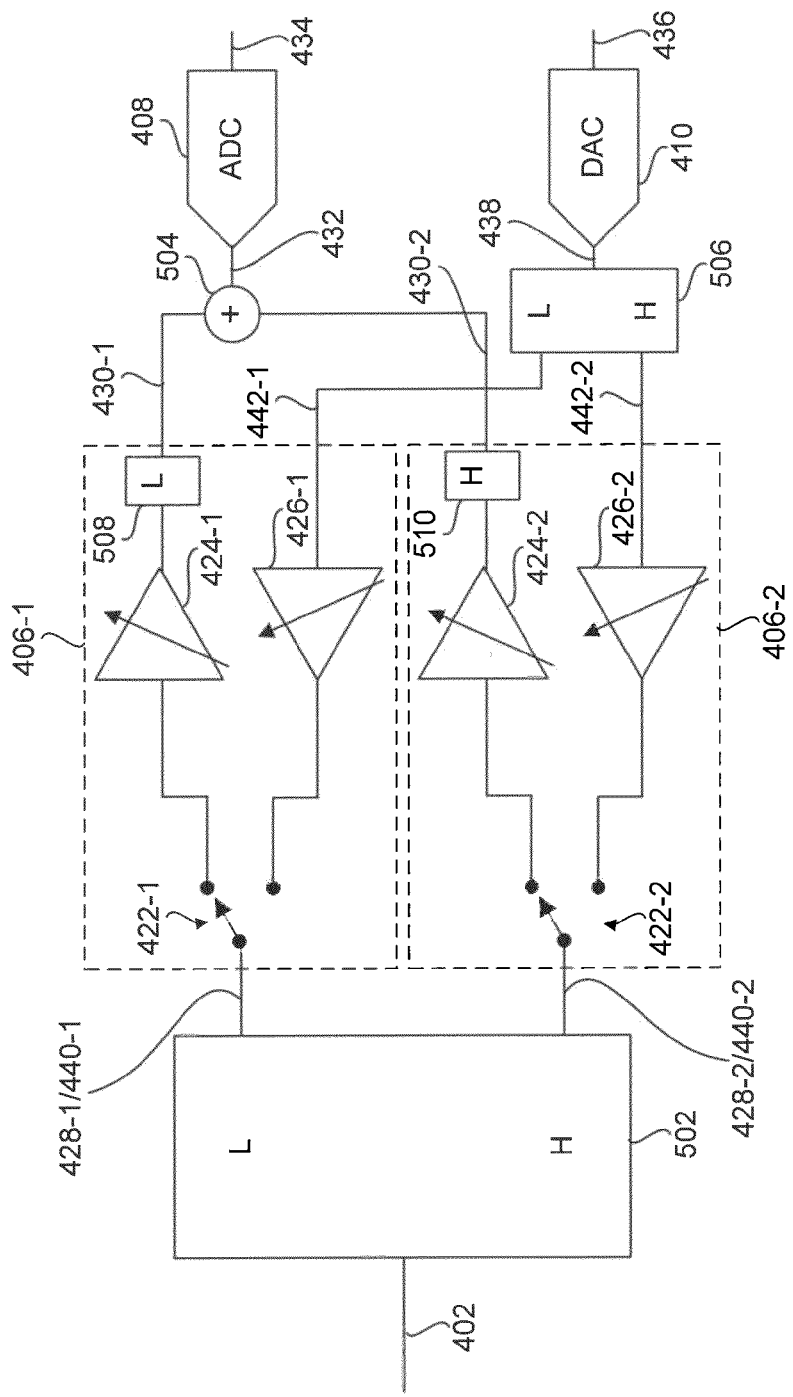
FIG. 5 illustrates another example multi-service transceiver according to an embodiment of the present invention.

FIG. 5 illustrates another example multi-service transceiver 500 according to an embodiment of the present invention. Example transceiver 500 supports two services, each service transmitted/received over a respective frequency band. The supported services can be any of the example services described above, including, without limitation, CATV service, DBS service, home networking (e.g., MOCA, broadcast television (e.g., analog, AATSC, DBV-T/T2), broadcast FM radio, navigation services (e.g., GPS and Galileo), WiFi®, Bluetooth®, cellular phone service, cordless phone service, and other new communication services using television "white spaces" spectrum.

Example transceiver 500 has a similar architecture as example transceiver 400 described above. For frequency multiplexer/demultiplexer module 404, example transceiver 502 uses a diplexer 502. Diplexer 502 includes a low pass filter and a high pass filter, configured respectively according to a low frequency service (e.g., MoCA) and a high frequency service (e.g., DBS) supported by transceiver 500. Diplexer 502 operates in a bi-directional manner. For example, in the receive direction, the low pass filter (high pass filter) of diplexer 502 filters the analog signal received over communications medium 402, to block/attenuate (pass/amplify) high frequency service content and pass/amplify (block/attenuate) low frequency service content. Similarly, in the transmit direction, the low pass filter (high pass filter) of diplexer 502 filters analog signal 440-1 to block/attenuate (pass/amplify) high frequency service content and pass/amplify (block/attenuate) low frequency service content.

Example transceiver 500 also includes a second diplexer 506 at the output of DAC 410. Diplexer 506 is optional according to embodiments of the present invention. Like diplexer 502, diplexer 506 includes a low pass filter and a high pass filter, configured respectively according to a low frequency service (e.g., MoCA) and a high frequency service (e.g., DBS) supported by transceiver 500. Diplexer 506 separates analog signal 438 into analog signals 442-1 and 442-2, each containing a respective service content. By separating analog signal 438, each service content can be amplified separately (e.g., according to its specific transmit power requirements) by its respective front end 406.

Example transceiver 500 also uses a combiner 504 to combine gain controlled analog signals 430-1 and 430-2. Combiner 504 may be any known combiner capable of combining analog signals to produce a composite analog signal (e.g., Wilkinson, hybrid combiners, or known active combiners).

Typically, as described above, analog signals 430-1 and 430-2 are equalized in front end modules 406-1 and 406-2, respectively, prior to combining them using combiner 504. Equalization is needed because the received levels of multiple services may be difficult to control in a home environment. Referring to scenario 200 described above, for example, the MoCA service, which is typically transmitted from one room to another within house 202, may be received at higher (or lower) power level by gateway 210 than the DBS satellite service sent down from the rooftop of house 202. Generally, the levels of both services are affected by coaxial cable loss versus distance. In addition, the DBS satellite service may be affected by weather conditions (e.g., rain) that can attenuate the signal level. As such, the MoCA service may swamp out the DBS satellite service in the composite analog signal, or vice versa. Equalizing the levels of analog signals 430-1 and 430-2 prevents such scenario from occurring and further allows for the dynamic range requirement of ADC 408 to be reduced by limiting the range of analog input values.

In addition, signals 430-1 and 430-2 are optionally filtered using low pass filter 508 and high pass filter 510, respectively, prior to them being combined using combiner 504. Low pass filter 508 and high pass filter 510 prevent the noise floor from summing onto the desired band in combiner 504.

In an embodiment, LNAs 424-1 and 424-2 of front end modules 406-1 and 406-2, respectively, are implemented with automatic gain control (AGC) to provide the equalization of analog signals 430-1 and 430-2. AGC is commonly employed when the amplitude of an incoming signal may vary over a wide dynamic range. The role of AGC is to provide a relatively constant output amplitude, thus lowering the required dynamic range of subsequent circuits.

Figure 6:
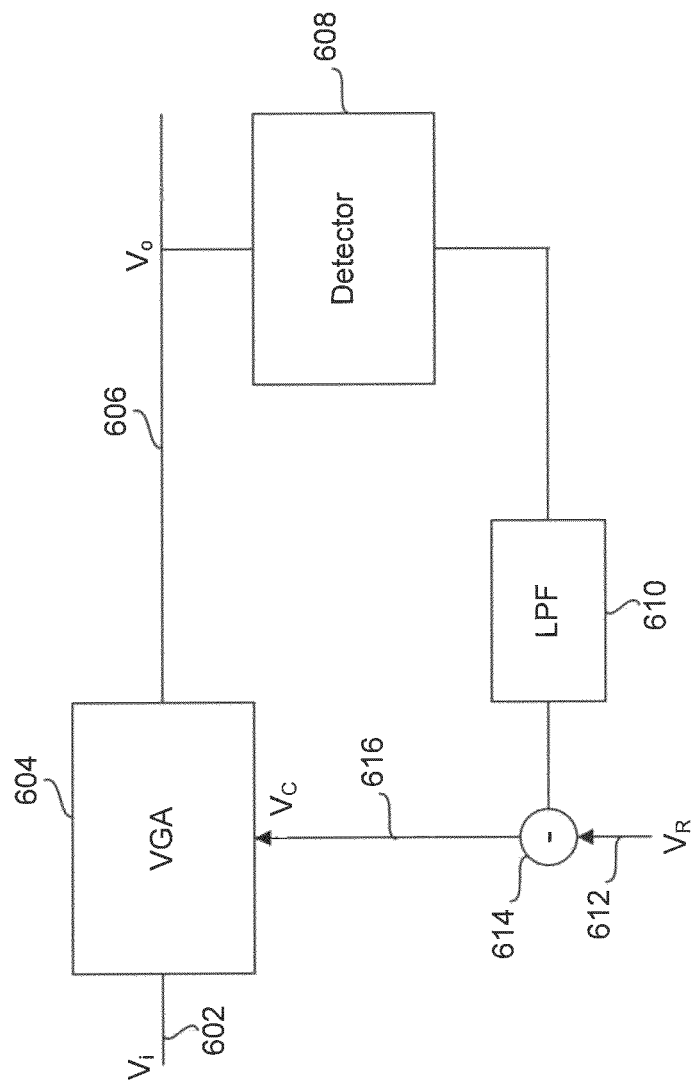
FIG. 6 illustrates an example low-noise amplifier (LNA) with automatic gain control (AGC) according to an embodiment of the present invention.

FIG. 6 illustrates an example low-noise amplifier (LNA) 600 with automatic gain control (AGC) according to an embodiment of the present invention. Example LNA 600 is provided for the purpose of illustration only and is not limiting of embodiments of the present invention.

As shown in FIG. 6, example LNA 600 includes a variable gain amplifier (VGA) 604, a detector 608, a low pass filter 610, and a subtractor module 614. VGA 604 receives an input signal $V_i$ 602 and generates an output signal $V_O$ 606. The relative gain of signal $V_O$ 606 is determined by a control signal $V_C$ 616, which controls the gain of VGA 604. Control signal $V_C$ 616 is produced by subtractor module 614 as a difference error between a reference signal $V_R$ 612 and output signal $V_O$ 606, detected by detector 608 and optionally filtered by LPF 610.

Figure 7:
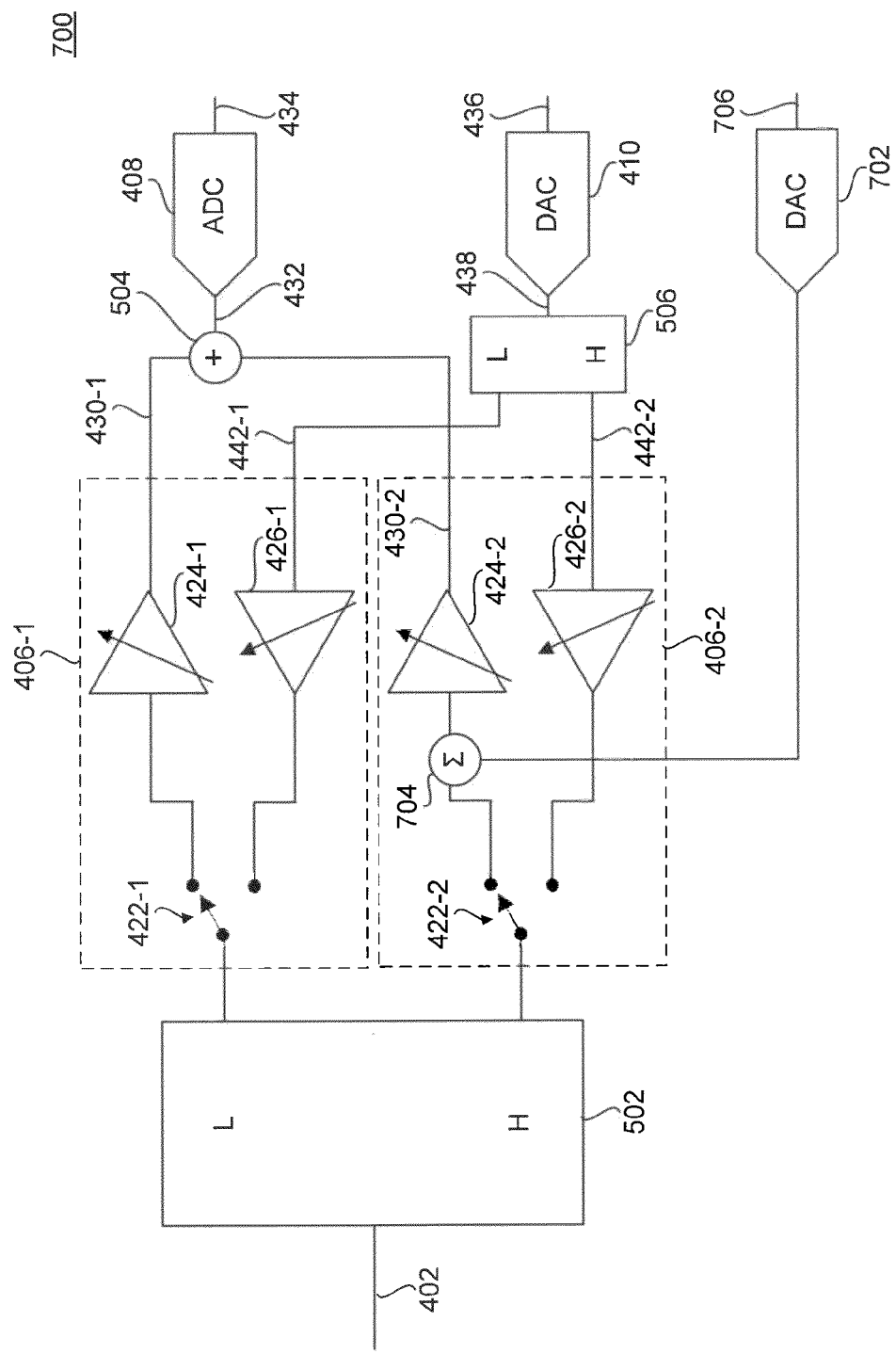
FIG. 7 illustrates another example multi-service transceiver according to an embodiment of the present invention.

FIG. 7 illustrates another multi-service transceiver 700 according to an embodiment of the present invention. Example transceiver 700 is similar to example transceiver 500 described above. In addition, example transceiver 700 includes means to reduce or eliminate leakage of service content, transmitted by transceiver 700, onto service content, received by transceiver 700.

For example, referring to FIG. 7, a low frequency service transmitted via the transmit path of front end module 406-1 may leak (in diplexer 502) onto the receive path of front end 406-2. To prevent leakage, diplexer 502 can be designed to have very high isolation, by ensuring that the low pass and high filters of diplexer 502 have sharp roll-off. However, this increases the size and cost of diplexer 502.

As an alternative to increasing the isolation of diplexer 502, transceiver 700 includes an auxiliary DAC 702 coupled, via a combiner 704, to the receive path of front end module 406-2. DAC 702 is controlled by a digital signal 706 that represents a gain and phase adjusted version of the transmitted low frequency service content. Specifically, digital signal 702 is configured so that the analog output of DAC 702 combines destructively (i.e., same amplitude and opposite phase) at combiner 704 with any leakage due to the low frequency service content transmitted by DAC 410.

As would be understood by a person of skill in the art based on the teachings herein, embodiments result in significant area, cost, and power savings compared to conventional designs. Specifically, embodiments allow for significant portions of the transmitter/receiver front ends of conventional designs to be reduced to a single DAC/ADC. Costly analog mixers, oscillators, and PLLs can thus be eliminated. According to embodiments, a single PLL is needed to provide a clock to the ADC. Further, this PLL does not require frequency agility or fine tuning, and is therefore relatively simple.

Example embodiments have been described above with respect to specific types of services and/or number of supported services. As would be understood by a person of skill in the art based on the teachings herein, embodiments may be designed to support any number of services. The supported services can be any of the example services described above, including, without limitation, CATV service, DBS service, home networking (e.g., MOCA, broadcast television (e.g., analog, AATSC, DBV-T/T2), broadcast FM radio, navigation services (e.g., GPS and Galileo), WiFi®, Bluetooth®, cellular phone service, cordless phone service, and other new communication services using television "white spaces" spectrum.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A multi-service transceiver for transmitting and receiving service contents of a first service and a second service over a communications medium, comprising:
    a frequency multiplexer/demultiplexer module configured to receive an input analog signal over the communications medium, the input analog signal including received service contents of the first service and second service, and to generate first and second receive analog signals representing, respectively, the received service content of the first service and the received service content of the second service;
    first and second front end modules configured to amplify, respectively, the first and second receive analog signals, and to generate first and second gain controlled analog signals;
    a combiner configured to combine the first and second gain controlled analog signals to generate a first composite analog signal;
    an analog-to-digital converter (ADC) configured to receive the first composite analog signal and to generate a first composite digital signal; and
    a channelizer module configured to receive the first composite digital signal and to generate first and second digital streams, the first and second digital streams representing, respectively, the received service content of the first service and the received service content of the second service.

2. The multi-service transceiver of claim 1, wherein the channelizer module uses at least one of digital mixing and digital filtering to generate the first and second digital streams from the first composite digital signal.

3. The multi-service transceiver of claim 1, further comprising:
    a digital-to-analog converter (DAC) configured to receive a second composite digital signal, the second composite digital signal including first and second frequency up-converted modulated digital streams of the first service and second service, respectively, and to generate a second composite analog signal including transmit service contents of the first service and second service.

4. The multi-service transceiver of claim 3, further comprising:
    a frequency demultiplexer configured to receive the second composite analog signal and to generate first and second transmit analog signals representing, respectively, the transmit service content of the first service and the transmit service content of the second service.

5. The multi-service transceiver of claim 4, wherein the first and second front end modules are further configured to amplify, respectively, the first and second transmit analog signals, and to generate first and second amplified transmit analog signals.

6. The multi-service transceiver of claim 5, wherein the frequency multiplexer/demultiplexer module is further configured to receive the first and second amplified transmit analog signals and to generate an output analog signal for transmission over the communications medium, the output analog signal including the transmit service contents of the first service and second service.

7. The multi-service transceiver of claim 4, wherein the frequency demultiplexer includes a diplexer, including first and second band-pass filters configured according to designated frequency bands of the first service and second service, respectively.

8. The multi-service transceiver of claim 4, wherein each of the first and second front end modules comprises:
    a receive path including a low-noise amplifier (LNA);
    a transmit path including a power amplifier (PA); and
    a transmit/receive (T/R) switch.

9. The multi-service transceiver of claim 8, further comprising:
    an auxiliary DAC configured to generate an output signal, representing a gain and phase adjusted version of the first transmit analog signal; and
    a combiner, located in the receive path of the second front end module, configured to combine the output signal of the auxiliary DAC with the second receive analog signal, thereby reducing leakage of the first transmit analog signal onto the receive path of the second front end module.

10. The multi-service transceiver of claim 8, wherein the LNA includes an automatic gain control (AGC) loop.

11. The multi-service transceiver of claim 3, further comprising:
    at least one digital modulator configured to modulate service content data of the first service and second service, respectively, to generate first and second modulated digital streams;
    at least one frequency up-converter configured to frequency up-convert the first and second modulated digital streams to respective first and second frequencies to generate first and second frequency up-converted modulated digital streams; and
    a combiner configured to combine the tip-converted modulated digital streams to generate the second composite digital signal.

12. The multi-service transceiver of claim 1, wherein the first and second front end modules are configured to amplify, respectively, the first and second receive analog signals so as to equalize their respective signal levels.

13. The multi-service transceiver of claim 1, wherein the frequency multiplexer/demultiplexer module includes a diplexer, including first and second band-pass filters configured according to designated frequency bands of the first service and second service, respectively.

14. The multi-service transceiver of claim 1, wherein the frequency multiplexer/demultiplexer module separates the received service contents contained in the input analog signal based on frequency to generate the first and second receive analog signals.

15. The multi-service transceiver of claim 1, wherein the multi-service transceiver is used in a multi-service gateway or set-top box (STB).

16. The multi-service transceiver of claim 1, wherein the communications medium includes at least one of: a coaxial cable and a wireless antenna.

17. The multi-service transceiver of claim 1, wherein the first service and second service are of same service type and different service channels.

18. The multi-service transceiver of claim 1, wherein the first service and the second service are of different service types.

19. The multi-service transceiver of claim 1, wherein the first service and second service include any two of the following services:
- cable television (CATV), direct broadcast satellite (DBS), DOCSIS, DVB-S/S2, home networking service, MOCA®, broadcast television, ATSC, Digital Video Broadcast-Terrestrial (DBV-T/T2), broadcast Frequency Modulation (FM) radio, navigation services, GPS, Galileo, WiFi®, Bluetooth®, cellular phone service, cordless phone service, and a communication service using television "white spaces" spectrum.

20. A multi-service transceiver for transmitting and receiving service contents of a first service and a second service over a communications medium, comprising:
- a digital-to-analog converter (DAC) configured to receive a composite digital signal, the composite digital signal including first and second frequency up-converted modulated digital streams of the first service and second service, respectively, and to generate a composite analog signal including transmit service contents of the first service and second service;
- a frequency demultiplexer configured to receive the composite analog signal and to generate first and second transmit analog signals representing, respectively, the transmit service content of the first service and the transmit service content of the second service; and
- a frequency multiplexer/demultiplexer configured to receive the first and second transmit analog signals and to generate an output analog signal for transmission over the communications medium, the output analog signal including the transmit service contents of the first service and second service, and wherein the frequency multiplexer/demultiplexer is further configured to receive an input analog signal over the communications medium, the input analog signal including received service contents of the first service and second service, and to generate first and second receive analog signals representing, respectively, the received service content of the first service and the received service content of the second service.

21. The multi-service transceiver of claim 20, further comprising:
first and second front end modules configured to amplify, respectively, the first and second transmit analog signals, and to generate first and second amplified transmit analog signals.

22. The multi-service transceiver of claim 20, further comprising:
- a combiner configured to combine the first and second receive analog signals to generate a first composite analog signal;
- an analog-to-digital converter (ADC) configured to receive the first composite analog signal and to generate a first composite digital signal; and
- a channelizer module configured to receive the first composite digital signal and to generate first and second digital streams, the first and second digital streams representing, respectively, the received service content of the first service and the received service content of the second service.

* * * * *

UNITED STATES PATENT AND TRADEMARK OFFICE
CERTIFICATE OF CORRECTION

| | | |
|---|---|---|
| PATENT NO. | : 8,792,521 B2 | Page 1 of 1 |
| APPLICATION NO. | : 13/243117 | |
| DATED | : July 29, 2014 | |
| INVENTOR(S) | : Gomez et al. | |

It is certified that error appears in the above-identified patent and that said Letters Patent is hereby corrected as shown below:

In the Claim

Claim 11, Column 10, line 56, please replace "the tip-converted" with --the up-converted--.

Signed and Sealed this
Twenty-first Day of October, 2014

Michelle K. Lee
*Deputy Director of the United States Patent and Trademark Office*